(12) United States Patent
Kobilka et al.

(10) Patent No.: US 11,572,503 B2
(45) Date of Patent: Feb. 7, 2023

(54) LIGHT UPCONVERSION MICROCAPSULE SHELLS

(71) Applicant: International Business Machines Corporation, Armonk, NY (US)

(72) Inventors: Brandon M. Kobilka, Fishkill, NY (US); Jason T. Wertz, Pleasant Valley, NY (US); Sarah K. Czaplewski-Campbell, Rochester, MN (US); Eric J. Campbell, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 16/987,878

(22) Filed: Aug. 7, 2020

(65) Prior Publication Data

US 2022/0041925 A1 Feb. 10, 2022

(51) Int. Cl.
| | | |
|---|---|---|
| *C09K 11/07* | (2006.01) | |
| *C07F 15/00* | (2006.01) | |
| *C09K 11/02* | (2006.01) | |
| *B01J 13/02* | (2006.01) | |
| *B01J 13/14* | (2006.01) | |

(52) U.S. Cl.
CPC .............. *C09K 11/07* (2013.01); *B01J 13/025* (2013.01); *B01J 13/14* (2013.01); *C07F 15/0093* (2013.01); *C09K 11/025* (2013.01); *C09K 2211/185* (2013.01)

(58) Field of Classification Search
CPC ........ B01J 35/004; B01J 13/025; B01J 13/14; C09K 11/07; C09K 11/025
See application file for complete search history.

(56) References Cited

U.S. PATENT DOCUMENTS

| | | | | |
|---|---|---|---|---|
| 8,129,908 B2 * | 3/2012 | Roebke | ................... | B64D 47/06 340/981 |
| 8,198,912 B1 * | 6/2012 | Thinakaran | .... | H03K 19/018585 326/30 |
| 9,196,860 B2 | 11/2015 | Xia | | |
| 9,291,561 B2 | 3/2016 | Hauser et al. | | |
| 10,175,557 B2 | 1/2019 | Murakami et al. | | |
| 2014/0271894 A1 | 9/2014 | Boday et al. | | |
| 2017/0168037 A1 * | 6/2017 | Moore | ............... | C08G 18/6225 |
| 2018/0106785 A1 * | 4/2018 | Landfester | ............. | C09K 11/06 |
| 2018/0313750 A1 * | 11/2018 | Greene | ...................... | D01F 1/04 |
| 2019/0275151 A1 | 9/2019 | Campos et al. | | |

FOREIGN PATENT DOCUMENTS

| | | | |
|---|---|---|---|
| CN | 105938875 B | | 8/2018 |
| CN | 108534909 A | | 9/2018 |
| CN | 111057174 | * | 4/2020 |
| JP | 11152416 A | | 6/1999 |
| KR | 101754777 B1 | | 7/2017 |
| WO | 2010098002 A1 | | 9/2010 |
| WO | 2014051393 A1 | | 4/2014 |
| WO | WO 2017/127717 | * | 7/2017 |

OTHER PUBLICATIONS

"Pd Porph-Basic Synthesis," SciFinder Results, 2 pages.
"Pd Porphyrin—Various Alkoxy Functionalities," SciFinder Results, 16 pages.
"Perylene Suzuki Reactions," SciFinder Results, 24 pages.
"Pt—Bonds Alternated," SciFinder Results, 3 pages.
"Pt—TP TNP," SciFinder Results, 3 pages.
"Pt Porphyrins with Some Functionalities," SciFinder Results, 21 pages.
Ashby et al., "Organometallic Reaction Mechanisms. 17. Nature of Alkyl Transfer in Reactions of Grignard Reagents with Ketones. Evidence for Radical Intermediates in the Formation of 1,2-Addition Product Involving Tertiary and Primary Grignard Reagents," Journal of the American Chemical Society, 1981, 103, pp. 2242-2250.
Basu et al., "Regioselective 5-exo-Trig Heterocyclization of 2-Allyl-1-naphthols under the Influence of N-Iodosuccinimide or Molecular Iodine in Aqueous Micelle," Research Article, Organic Chemistry International, 2012, Article ID 810476, 7 pages, Hindawi Publishing Corporation, doi:10.1155/2012/810476.
Bhunia et al., "Supporting Information for: Conjugated microporous polymer based visual sensing platform for aminoglycoside antibiotic in water," Electronic Supplementary Material (ESI) for ChemComm., 2018, pp. 1-24.
Caruso et al., "Microcapsules containing suspensions of carbon nanotubes," Journal of Materials Chemistry, Aug. 2009, vol. 19, pp. 6093-6096, DOI: 10.1039/b910673a.
Chen et al., "Electrochemistry of Platinum(II) Porphyrins: Effect of Substituents and π-Extension on Redox Potentials and Site of Electron Transfer," Inorganic Chemistry, 2012, 51, pp. 6200-6210, ACS Publications.
Katoueizadeh et al., "Morphological study of surface-modified urea—formaldehyde microcapsules using 3-aminopropyltriethoxy silane," Polymer Bulletin, 2019, (76)1317-1331, https://doi.org/10.1007/s00289-018-2425-8.
Kirchhoff et al., "Boronic Acids: New Coupling Partners in Room-Temperature Suzuki Reactions of Alkyl Bromides. Crystallographic Characterization of an Oxidative-Addition Adduct Generated under Remarkably Mild Conditions," Journal of the American Chemical Society, Nov. 2002, 124(46), pp. 13662-13663.
Kobilka et al., "Light Upconversion Microcapsules," U.S. Appl. No. 16/987,943, filed Aug. 7, 2020.
Lebedev et al., "Dendritic Phosphorescent Probes for Oxygen Imaging in Biological Systems," Applied Materials & Interfaces, vol. 1, No. 6, 2009, pp. 1292-1304.

(Continued)

*Primary Examiner* — C Melissa Koslow
(74) *Attorney, Agent, or Firm* — Kelsey M. Skodje

(57) ABSTRACT

A composition, method, and article of manufacture are disclosed. The microcapsule includes a polymer shell encapsulating a core component. The polymer shell includes light upconversion molecules. The article of manufacture includes the microcapsule. The method includes obtaining light upconversion molecules having sidechains with reactive functional groups, and forming a microcapsule. The microcapsule includes a polymer shell encapsulating a core component. The polymer shell includes light upconversion molecules. The article of manufacture includes the microcapsule.

20 Claims, 6 Drawing Sheets

(56) References Cited

OTHER PUBLICATIONS

Lebedev et al., "Dendritic Phosphorescent Probes for Oxygen Imaging in Biological Systems," Supporting Information, 2009, 144 pages.

List of IBM Patents or Patent Applications Treated as Related, Aug. 6, 2020, 2 pgs.

Lv et al., "Helical Fibrous Nanostructures Self-Assembled from Metal-Free Phthalocyanine with Peripheral Chiral Menthol Unites," ChemPhysChem, vol. 10, Issue 15, Oct. 19, 2009, pp. 2725-2732 (Abstract only).

Markon, I., "Counterfeit Prevention of Microelectronics through Covert Anti-Tamper Microcapsules," South Dakota School of Mines and Technology Research Experience for Undergraduates, Summer 2013, pp. 1-38.

Ravetz et al., "Photoredox catalysis using infrared light via triplet fusion upconversion," Nature, Jan. 17, 2019, vol. 565, pp. 343-346, https://doi.org/10.1038/s41586-018-0835-2.

Stober et al., "Controlled growth of monodisperse silica spheres in the micron range," Journal of Colloid and Interface Science, vol. 26, Issue 1, Jan. 1968, pp. 62-69, https://doi.org/10.1016/0021-9797(68)90272-5.

Tran et al., "A Perylene-Based Microporous Coordination Polymer Interacts Selectively with Electron-Poor Aromatics," Chemistry A European Journal, vol. 22, Issue 16, Apr. 11, 2016, pp. 5509-5513 (Abstract only).

West et al. (Eds), "Advances in Organometallic Chemistry," vol. 51, pp. 271-272.

\* cited by examiner

201

230

1. BF$_3$OEt$_2$, DCM
2. DDQ
3. [PtCl$_2$(PhCN)$_2$], PhCN

240

LIGHT UPCONVERSION MICROCAPSULE SHELLS

BACKGROUND

The present disclosure relates to materials for triplet fusion light upconversion and, more specifically, to light upconversion microcapsules with molecular sensitizer and annihilator shell functionalities.

Photoredox-catalyzed reactions require single electron transfer mediated by a photocatalyst. The photocatalyst can carry out this electron transfer when in an excited state caused by absorption of a photon. The amount of energy required to reach the redox-active excited state varies amongst photocatalysts, but generally wavelengths of light ranging from visible to ultraviolet (UV) must be absorbed. For example, some organic dyes are excited to a redox active state by absorption of yellow light, and some transition metal complexes are excited to a redox active state by absorption of blue light. These organic dyes and transition metal complexes can, therefore, act as photocatalysts when exposed to yellow or blue light, respectively

SUMMARY

Various embodiments are directed to a microcapsule. The microcapsule includes a polymer shell encapsulating a core component. The polymer shell includes light upconversion molecules. The light upconversion molecules can be bound to surface functionalities on the polymer shell and/or incorporated into the polymer shell via copolymerization. The light upconversion molecules can include a molecular sensitizer (e.g., a platinum complex of a porphyrin) and/or a molecular annihilator (e.g., an organic chromophore). Further, the light upconversion molecules can have sidechains with reactive functional groups. The reactive functional groups can include silyl groups.

Additional embodiments are directed to a method that includes obtaining light upconversion molecules having sidechains with reactive functional groups, and forming a microcapsule. The microcapsule includes a polymer shell encapsulating a core component. The polymer shell includes light upconversion molecules, and can also include a urea-formaldehyde polymer. The light upconversion molecules can be bound to surface functionalities on the polymer shell and/or incorporated into the polymer shell via copolymerization. The light upconversion molecules can include a molecular sensitizer and a molecular annihilator. The method can also include forming a reaction environment that includes the microcapsule, a photocatalyst, and a substrate.

Further embodiments are directed to an article of manufacture that includes a microcapsule. The microcapsule includes a polymer shell encapsulating a core component. The polymer shell includes light upconversion molecules. The light upconversion molecules can be bound to surface functionalities on the polymer shell and/or incorporated into the polymer shell via copolymerization. The light upconversion molecules can include a molecular sensitizer and a molecular annihilator. Further, the light upconversion molecules can have sidechains with reactive functional groups.

DETAILED DESCRIPTION

Figure 1:
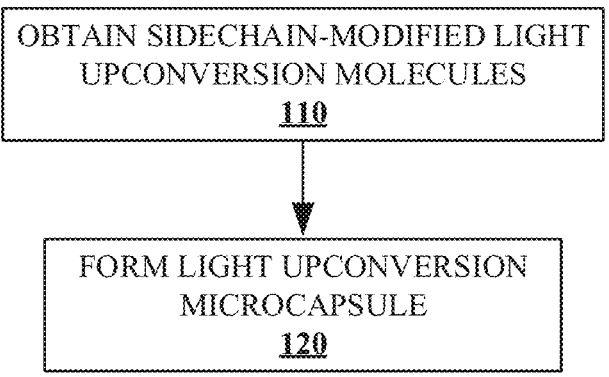
FIG. 1 is a flow diagram illustrating a process of forming a light upconversion microcapsule, according to some embodiments of the present disclosure.

Light conversion devices are used to convert light (e.g., from solar radiation and/or artificial light sources) into electrical or chemical energy. For example, solar conversion devices can include photocatalysts that absorb solar radiation at the earth's surface. Solar radiation includes ultraviolet (UV) light (~115 nm-480 nm), visible light (~480-750 nm), and near-infrared (NIR) light (~750 nm-2500 nm). The majority of this radiation is in the visible (~41%) and NIR (~42%) regions of the electromagnetic spectrum. The remainder of the solar radiation is primarily UV light (~6%) and mid-infrared light (~1%).

The light absorbed by a photocatalyst in a light conversion device can excite a photocatalyst to a higher energy level ("excited state"), which allows the photocatalyst to donate an electron to a substrate (e.g., a reactant in a photocatalyzed reaction). Most photocatalysts require UV or visible light to transition to an excited state. UV and visible light provide energy ranging from about 50-80 kcal mol$^{-1}$. However, NIR light can only provide energy up to about 35 kcal mol$^{-1}$, which is insufficient for exciting most photocatalysts to the state necessary for single electron transfer (SET). This means that only about half of the energy from solar radiation is available for photocatalytic conversion to chemical and electrical energy. Additionally, the ability of UV and visible light to penetrate most reaction media is much lower than that of NIR light. This can limit the efficacy of UV and visible light in large-scale photocatalyzed reactions.

However, there are techniques for generating visible light by upconverting NIR light via triplet fusion. In triplet fusion, there are two species: a sensitizer ([Sen]) and an annihilator ([An]). The sensitizer absorbs a low-energy photon in order to transition to a singlet excited state ($^1$[Sen]*). Herein, "low-energy photon" refers to a photon in the NIR or red region of the electromagnetic (EM) spectrum unless otherwise specified. The specific low-energy photon wavelength(s) required to excite [Sen] to $^1$[Sen]* depends upon the type of molecular sensitizer. This is discussed in greater detail below.

$^1$[Sen]* then decays into a triplet excited state ($^3$[Sen]*), and the $^3$[Sen]* molecules transfer their energy to [An] molecules, resulting in triplet excited state annihilator ($^3$[An]*) molecules. Pairs of $^3$[An*] molecules then undergo triplet fusion, resulting in one of the pair transitioning to a higher energy singlet excited state ($^1$[An]*). $^1$[An]* then decays via fluorescence, emitting a higher energy photon that the low-energy photon absorbed by [Sen]. The higher energy photon can be in the visible spectrum. The energy of the emitted photon can be tuned by the selection of sensitizer/annihilator pairs.

Various organic and metal-complex chromophores can be used as sensitizers and annihilators. For example, a palladium(II) octabutoxyphthalocyanine sensitizer paired with a furanyldiketopyrrolopyrrole annihilator can upconvert low energy photons to photons of about 530-630 nm, enabling activation of photocatalysts that require yellow (e.g., ~560 nm-590 nm) and/or green (e.g., ~520 nm-560 nm) light. Examples of these photocatalysts can include organic compounds such as eosin Y (2',4',5',7'-tetrabromofluorescein) and rose bengal (4,5,6,7-tetrachloro-2',4',5',7'-tetraiodofluorescein). Additionally a platinum(II) meso-tetraphenyltetranaphthoporphyrin sensitizer can be paired with a 2,5,8,11-tetra-tert-butylperylene annihilator to produce blue light (e.g., $\lambda_{max}$=~450 nm). This blue light can activate photocatalysts such as [Ru(bpy)$_3$]$^{2+}$ and other transition metal complexes.

There is potential for the use of [Sen]/[An] triplet fusion upconversion in photocatalytic systems. For example, photocatalysts can be excited by visible light generated by the triplet fusion upconversion. This can allow the energy from NIR solar radiation to be harnessed for photoredox reactions. However, the use of [Sen]/[An] pairs is limited by the availability of techniques for packaging and incorporating these species into reaction environments for various applications. Therefore, there is a need for new materials that can facilitate the use of NIR-to-visible light upconversion in a variety of photoredox reaction environments.

Microcapsule shells with shell-incorporated light upconversion molecules are disclosed herein. Unless otherwise specified, the light upconversion molecules can be sensitizers, annihilators, or a combination thereof. Sidechain-modified light upconversion molecules are prepared. Herein, "sidechain-modified" refers to molecules having substituents with reactive functional groups that can bind or adhere to a substrate (e.g., via covalent, ionic, and/or hydrogen bonds). The substrate can be a binding site on the surface of a microcapsule shell. The substrate can also be a shell-forming monomer. In these instances, the sidechain-modified [Sen] and/or [An] molecules can be incorporated into the shell polymer via copolymerization or crosslinking.

The resulting microcapsules having light upconversion shells can have cores containing a variety of materials such as self-healing materials, fragrances, medications, flame-retardants, dyes, catalysts, solvents, oils, solid particles, etc. In some embodiments, there can be light upconversion molecules in/on the shell and in the core. The light upconversion microcapsules can be used in a variety of applications. Examples of these applications can include solar cells, anticounterfeiting, security tagging, polymerization, medical treatment or imaging, purification systems, etc.

FIG. 1 is a flow diagram illustrating a process 100 of forming a light upconversion microcapsule, according to some embodiments of the present disclosure. Sidechain-modified light upconversion molecules are obtained. This is illustrated at step 110. The sidechain-modified light upconversion molecules can be functionalized derivatives of various sensitizer and/or annihilator molecules. Examples of sensitizers can include molecular compounds having high absorption coefficients in the NIR and/or red regions of the electromagnetic spectrum. For example, the sensitizer can be a sidechain-modified derivative of platinum(II) tetraphenyltetranaphthoporphyrin (FIGS. 2A and 2B) or palladium (II) octabutoxyphthalocyanine (FIG. 2C). However, other compounds capable of absorbing a photon and transferring triplet excitation energy to an annihilator can be selected.

Further examples of sensitizers that can be prepared with modified sidechains can include various metal complexes (e.g., transition metal complexes of porphyrins or phthalocyanines). In some embodiments, the sensitizer is a transition metal (e.g., Pt, Pd, Zn, Cu, Co, Ru(CO), etc.) complex of a β- and/or meso-substituted porphyrin (e.g., 2-(3-[10, 15,20-tris(3,5-di-tert-butylphenyl)porphyrin-5-yl]phenoxy) ethanol, octaethylporphyrin, tetrabenzoporphyrin, tetranaphthoporphyrin, tetraanthraporphyrin, tetraphenyltetrabenzoporphyrin, tetraphenyltetraanthraporphyrin, etc.) or phthalocyanine (e.g., octabutoxyphthalocyanine, octa-triethyleneoxysulfonyl phthalocyanine, etc.).

Additional examples of sensitizers that may be used can include sidechain-modified metal complexes of naphthalocyanines, chlorins, and other cyclic tetrapyrroles. Sensitizers can also include fused ring systems that include more than one porphyrin, phthalocyanine, and/or other macrocyclic compounds. In some embodiments, the sensitizers can be metal-free macrocyclic compounds such as sidechain-modified porphyrins, phthalocyanines, naphthalocyanines, chlorins, etc., or organic dyes such as purpurin.

Figure 3A:
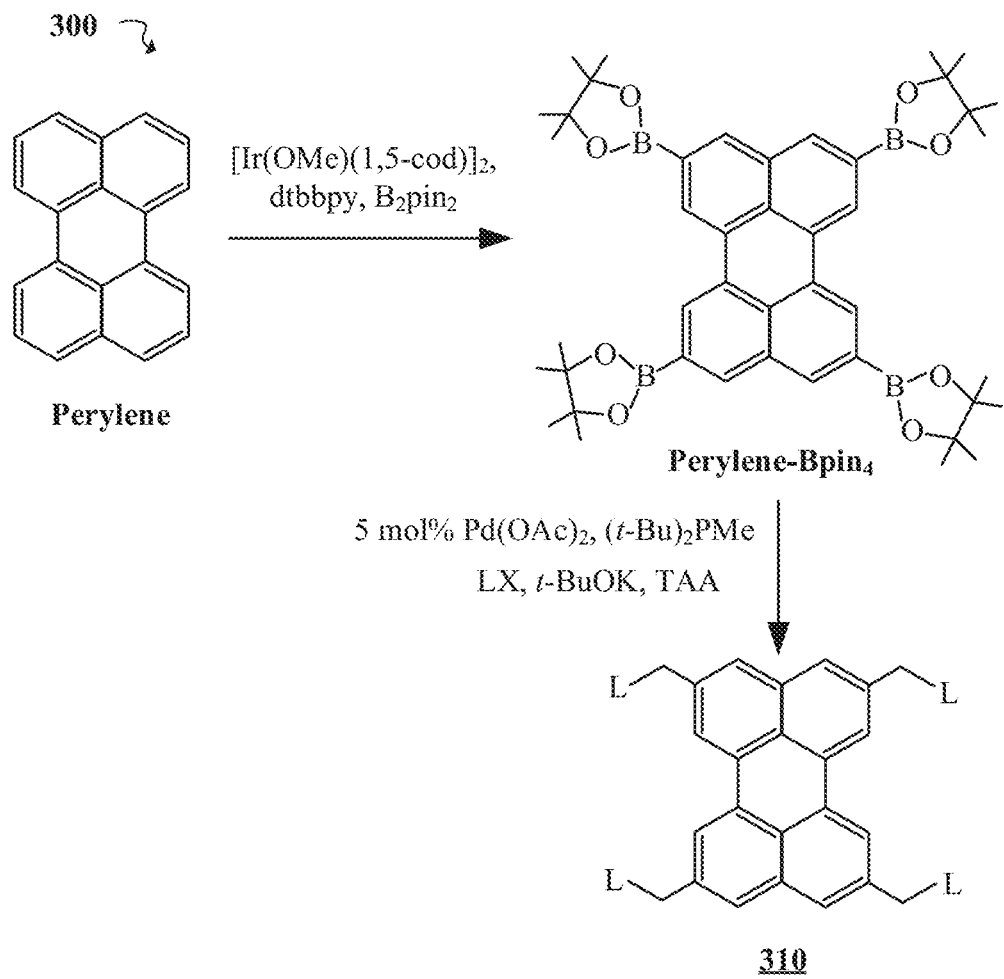
FIG. 3A is a chemical reaction diagram illustrating a process of forming a first sidechain-modified molecular annihilator, according to some embodiments of the present disclosure.
Figure 3B:
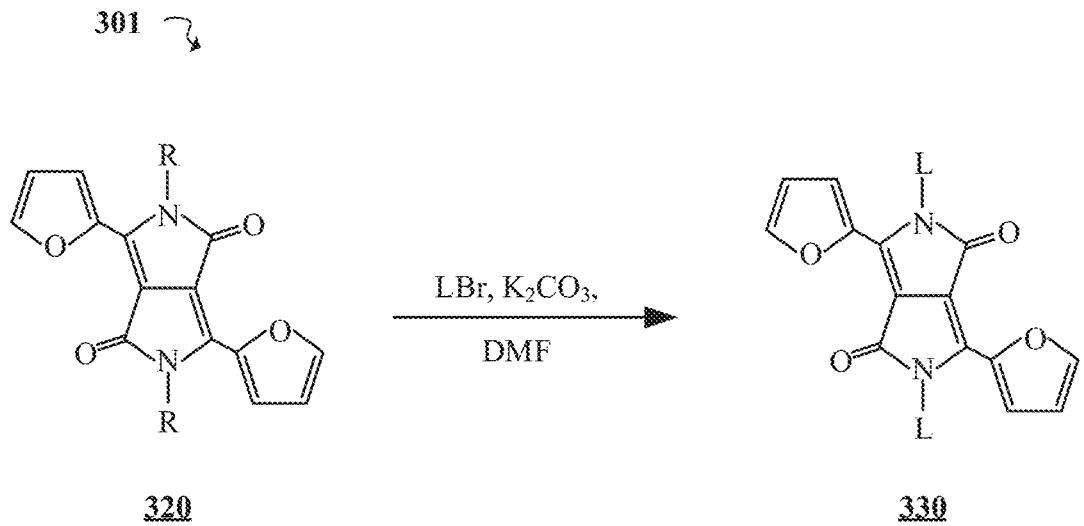
FIG. 3B is a chemical reaction diagram illustrating a process of forming a second sidechain-modified molecular annihilator, according to some embodiments of the present disclosure

The sidechain-modified [An] can be derived from a molecular annihilator such as a perylene or diketopyrrolopyrrole. Examples of sidechain-modified perylenes and sidechain-modified diketopyrrolopyrroles are illustrated in FIGS. 3A and 3B, respectively. However, the annihilator can be selected from various organic compounds (e.g., fluorophores, chromophores, dyes, etc.), which may have high fluorescence quantum yields (e.g., about 0.9-0.95, 0.8-0.99, 0.6-1, etc.). Additional examples of annihilators that can be used can include sidechain-modified derivatives of rubrene (5,6,11,12-tetraphenyltetracene), 9,10-diphenylanthracene, 9,10-bis(phenylethynyl)anthracene, 2,5-diphenyloxazole, etc.

[Sen] and [An] can be selected as a pair based on the wavelength of light that can be absorbed by [Sen] and/or the wavelength of light emitted by $^1$[An]* upon fluorescent decay. For example, in instances where a reaction requires a photocatalyst that absorbs yellow light, an appropriate sensitizer can be paired with an annihilator where decay of $^1$[An]* emits yellow light. Examples of photocatalysts, sensitizers, and annihilators that can be used are discussed in greater detail below. In some embodiments, an annihilator is paired with a sensitizer where the energy of $^3$[Sen]* is slightly higher than that of $^3$[An]. However, any sensitizer where $^3$[Sen]* can transfer sufficient energy to excite [An] to $^3$[An] can be used. Additional factors that can be considered in choosing a [Sen]/[An] pair can include solubility, reactivity, efficiency, etc.

Sidechain-modified derivatives of a selected [Sen]/[An] pair are obtained via various techniques. Examples of these techniques include synthetic methods discussed in greater detail with respect to FIGS. 2A-3C. The sidechains on the resulting modified [Sen] and [An] molecules can include substituents with groups such as vinyl, acrylate, thiol, phenol, styrene, etc. In some embodiments, an unmodified sensitizer or annihilator can be selected as well. This is discussed in greater detail below.

In some embodiments, sidechain modifications can produce upconversion molecules with increased solubility in aqueous or polar protic solvents. For example, a sidechain-modified upconversion molecule can be grafted to a PEG molecule (e.g., PEG polymer or oligomer) having the following structure:

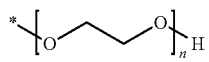

where n is an integer greater than or equal to 1, and where the starred bond is to a functional group such as vinyl, allyl, vinyl ketone (to form acrylate), thiol, amine, epoxide, styrene, etc. In other embodiments, the solubility of the upconversion molecules in non-polar solvents can be increased by attaching sidechains such as linear hydrocarbons or other hydrophobic groups.

Microcapsules having light upconversion shells are then formed. This is illustrated at step 120. The light upconversion shells are formed to encapsulate a core component. The core component can be a solution of one or more compounds dissolved in an aromatic solvent such as chlorobenzene (PhCl) or ethyl phenylacetate (EPA), a non-aromatic solvent such as chloroform, a solvent mixture such as trifluorotoluene/acetonitrile, or another appropriate solvent. The core component can also be a suspension of an insoluble material in a medium such as a liquid, oil, gel, or solid. Materials that can be dissolved or suspended in the core component can include flame retardants, fragrances, self-healing materials, dyes, medications, photocatalysts, polymerizing materials (e.g., monomers, radical initiators, etc.), etc. In some embodiments, the core component can include light upconversion molecules. These light upconversion molecules can be unmodified or modified to include sidechains for increasing solubility in the core component solvent. In other embodiments, the core component does not include solutes or suspended materials. For example, the core component can be a pure solvent, oil, or solid (e.g., a polymer or metal).

Figure 4A:
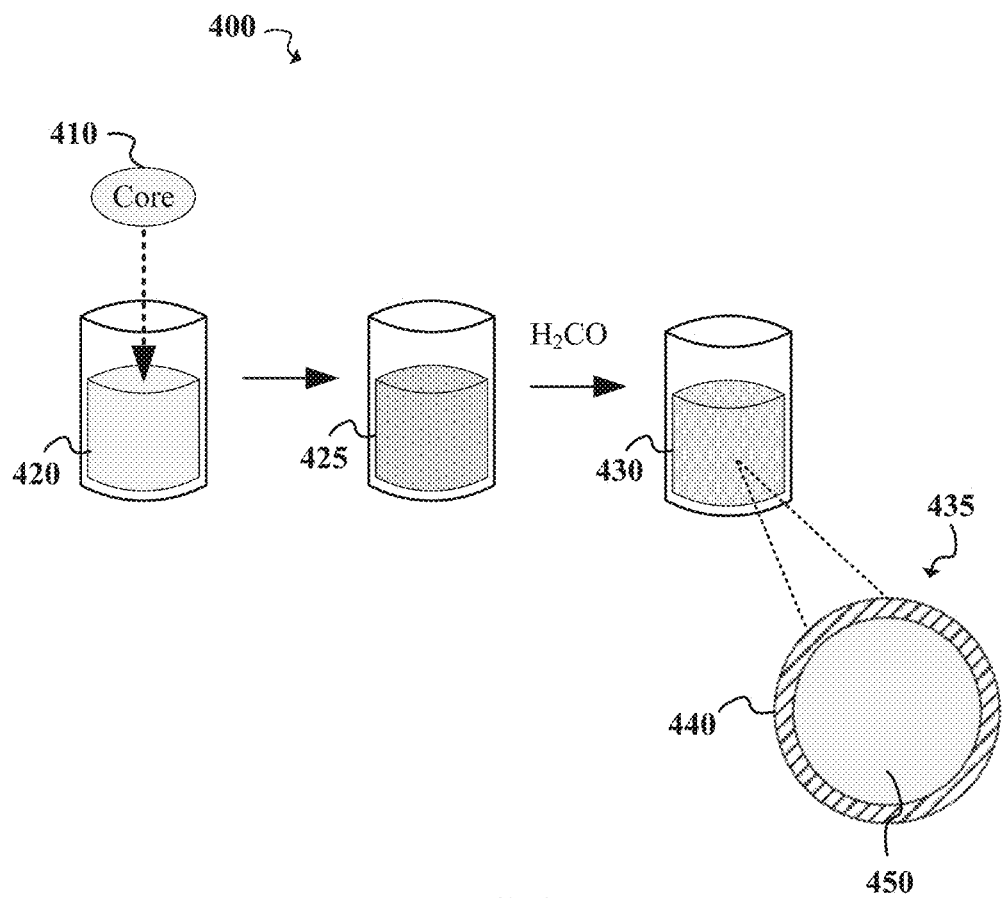
FIG. 4A is a schematic diagram illustrating a process of forming surface-modified light upconversion microcapsules, according to some embodiments of the present disclosure.

When the core component includes a liquid, an emulsion of the core component in a solution of shell-forming reactants is prepared. For example, a non-polar core component can be added to a shell-formation mixture that includes a solvent (e.g., water) and at least one shell-forming monomer (e.g., urea, resorcinol, sidechain-modified light upconversion molecules, etc.) The emulsion can also include stabilizers, emulsifying agents, etc. A polymerizing reactant (e.g., an additional shell-forming monomer and/or curing agent) is added to the emulsion, resulting in polymerization of the shell-forming monomers to form shells around droplets of the core component. An example of microcapsule formation is illustrated in FIG. 4A.

In some embodiments, the shell-forming monomers include sidechain-modified light upconversion molecules. In these instances, the light upconversion molecules can be incorporated into the shell polymer during formation of the microcapsule. For example, upconversion molecules having sidechains that include phenol groups may be reacted with urea and formaldehyde to form light upconversion UF shells around the core component. Upconversion molecules having reactive sidechains can also be bound to the surface of the microcapsule after the shell has formed. For example, upconversion molecules with silyl sidechains (e.g., triethoxysilyl, trimethoxysilyl, etc.) can be bound to hydroxyl groups on the surface of UF microcapsules to form light upconversion UF shells around droplets of the core component.

In some embodiments, there can be a microcapsule shell that includes [Sen] in the shell polymer matrix and surface-bound [An], or vice versa. Further, in some embodiments there can be a light upconversion microcapsule with a shell having only one type of light upconversion molecule. and a core component with the complementary light upconversion molecule (e.g., a microcapsule with a [Sen] shell and an [An] core). In these instances, [Sen] or [An] from the light upconversion shell of the microcapsule 470 can be paired with light upconversion molecules ([An] or [Sen], respectively) from another microcapsule, in a solution in which the microcapsule 470 is suspended, in the core component of the microcapsule 470, etc.

Figure 2A:
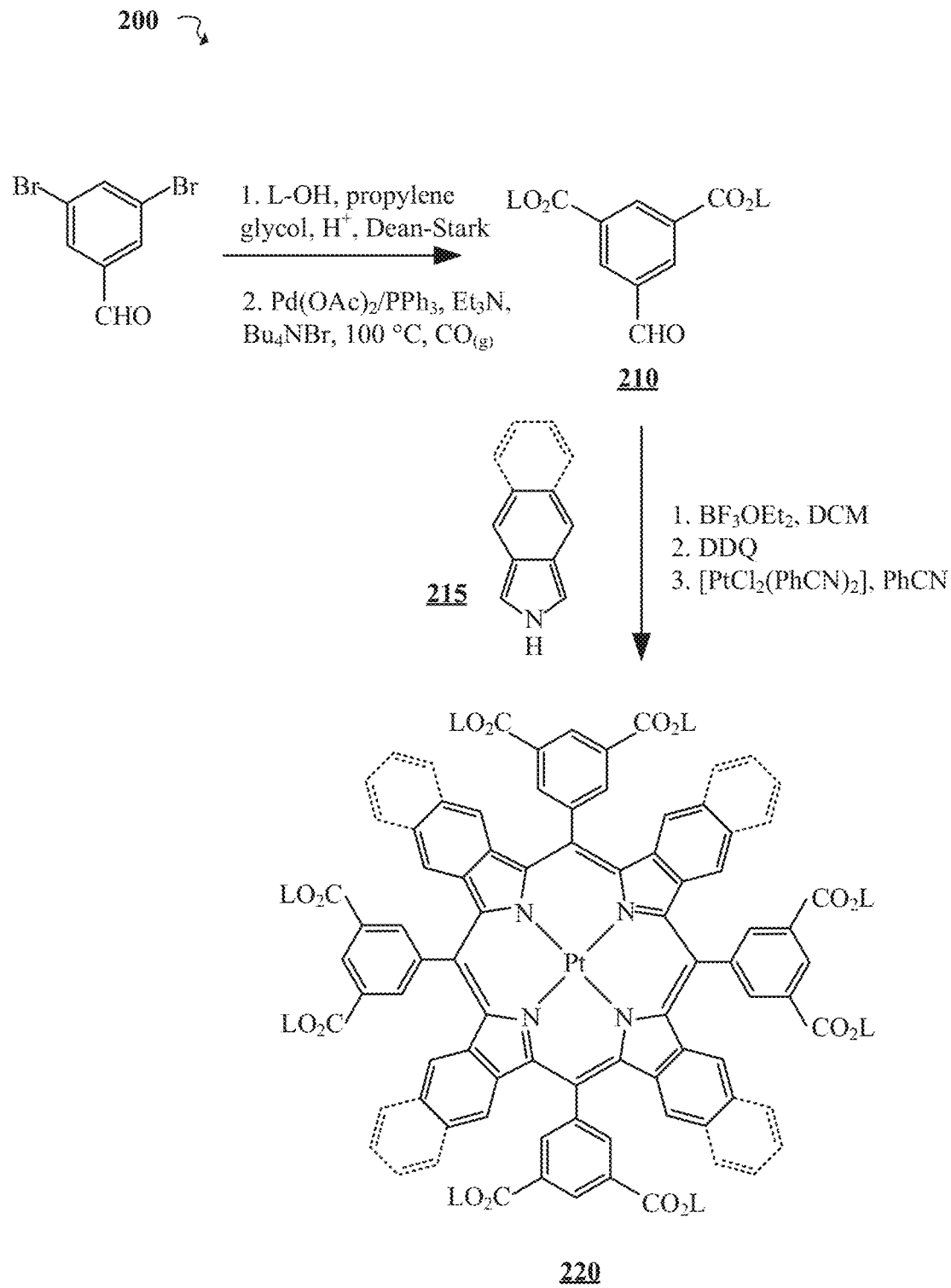
FIG. 2A is a chemical reaction diagram illustrating a process of forming a first sidechain-modified molecular sensitizer, according to some embodiments of the present disclosure.

FIG. 2A is a chemical reaction diagram illustrating a process 200 of forming a first sidechain-modified molecular sensitizer, according to some embodiments of the present disclosure. A mixture containing propylene glycol, 3,5-dibromobenzaldehyde, and a proton ($H^+$) donor (e.g., HCl, $H_2SO_4$, etc.) is prepared. The mixture can be prepared in a Dean-Stark distillation apparatus. In other embodiments (not shown) the 3,5-dibromobenzaldehyde can be replaced by another aryl halide. An alcohol (L-OH) is also added to the reaction mixture in order to provide L sidechain groups. Examples of L groups can include alkyls, PEG molecules, and groups having the structure:

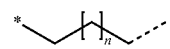

where n is an integer greater than or equal to 1, and where the starred bond is to a moiety such as a protected thiol (e.g., a thiolacetate), methylmethacrylate, oxirane, ethylene carbonate, trialkylsilyl, trialkoxysilyl (e.g., triethoxysilyl, trimethoxysilyl, etc.), carboxylic acid, carboxylate ester, acid chloride, a protected phenol (e.g., having a protecting group such as an acyl, sulfonyl, or derivative thereof), etc.

A palladium acetate/triphenylphosphine catalyst (Pd(OAc)$_2$/PPh$_3$, triethylamine (Et$_3$N), and tetra-n-butylammonium bromide (Bu$_4$NBr) are added to the mixture. In some embodiments, other catalysts can be used, such as PdI$_2$(mbth)$_2$, where mbth is 3-methyl-2-benzothiazolinone hydrazone. The mixture is reacted at approximately 100° C. under a carbon monoxide (CO) atmosphere (~100-810 kPa CO$_{(g)}$). This results in esterification of the 3,5-dibromobenzaldehyde to produce an L-functionalized 3,5-dicarboxylate benzaldehyde 210.

The 3,5-dicarboxylate benzaldehyde 210 is combined with a fused benzopyrrole 215 such as isoindole (solid lines) or 2H-benzo[f]isoindole (dashed lines). The 3,5-dicarboxylate benzaldehyde 210 and fused benzopyrrole 215 are mixed with boron trifluoride diethyl etherate (BF$_3$OEt$_2$) in dichloromethane (DCM). In additional steps, 2,3-dichloro-5,6-dicyano-1,4-benzoquinone (DDQ) is added to the reaction, followed by bis(benzonitrile)dichloroplatinum(II) dichloride ([PtCl$_2$(PhCN)$_2$]) in benzonitrile (PhCN). The reaction produces a Pt(II) meso-L-functionalized porphyrin complex ("Pt-meso complex") 220. The Pt-meso complex 220 is a sidechain-modified molecular sensitizer where substituents in meso (methine bridge) positions on the porphyrin ring have L sidechains.

In some embodiments, the Pt-meso complex 220 can be reacted further to modify the L sidechains. This is not illustrated in FIG. 2A. For example, a methanol/water (10:1) solution of potassium hydroxide (KOH) can be added to the Pt-meso complex 220 in tetrahydrofuran, followed by addition of an acid such as hydrochloric acid in water. The resulting reaction forms a Pt-meso complex with meso substituents with carboxylic acid L groups (not shown). In some embodiments, this carboxylic acid-functionalized derivative of the Pt-meso complex 220 can be reacted with an organohalide compound (e.g., LBr, where L is an alkyl group) and potassium carbonate ($K_2CO_3$) in a dimethylsulfoxide/acetone solution. This can produce a molecular sensitizer (not shown) analogous to the Pt-meso complex 220, but where the L groups have been provided by the organohalide compound. Examples of alkyl groups are discussed in greater detail below.

Figure 2B:
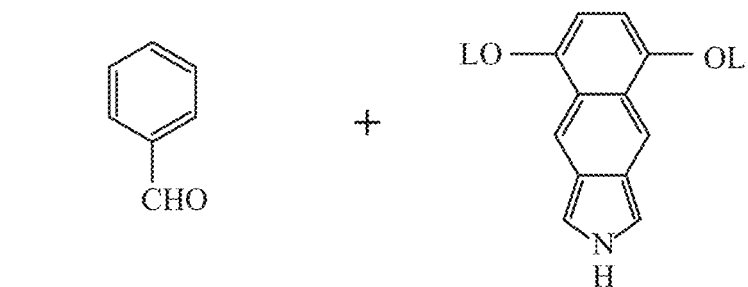
FIG. 2B is a chemical reaction diagram illustrating a process of forming a second sidechain-modified molecular sensitizer, according to some embodiments of the present disclosure.
Figure 2B:
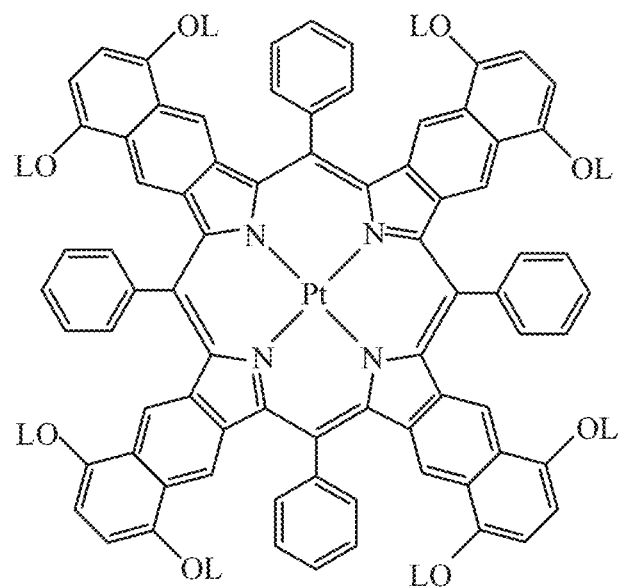
Figure 2C:
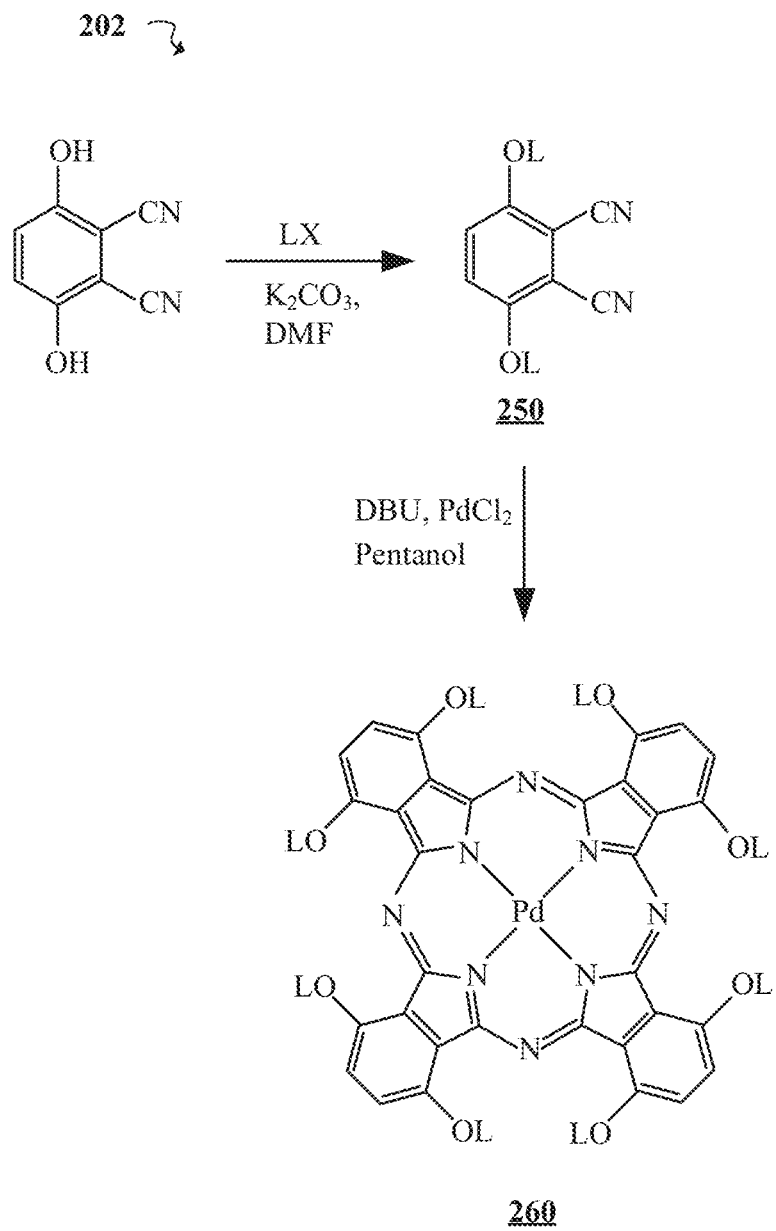
FIG. 2C is a chemical reaction diagram illustrating a process of forming a third sidechain-modified molecular sensitizer, according to some embodiments of the present disclosure.

FIG. 2B is a chemical reaction diagram illustrating a process 201 of forming a second sidechain-modified molecular sensitizer, according to some embodiments of the present disclosure. Benzaldehyde is combined with an L-functionalized fused benzopyrrole (2H-benzo[f]isoindole) 230. Examples of L groups are discussed in greater detail with respect to FIG. 2A. The benzaldehyde 210 and L-functionalized fused benzopyrrole 230 are mixed with $BF_3OEt_2$ in DCM. Then, 2,3-dichloro-5,6-dicyano-1,4-benzoquinone (DDQ) is added to the reaction, followed by $[PtCl_2(PhCN)_2]$ in PhCN. The reaction produces a Pt(II) β-L-functionalized porphyrin complex ("Pt-β complex") 240. The Pt-β complex 240 is a sidechain-modified molecular sensitizer where substituents in β (pyrrolic ring) positions on the porphyrin ring have L functional groups.

In other embodiments, a Pt(II) porphyrin molecular sensitizer having L-functionalized substituents in both meso and β positions on the porphyrin ring ("Pt-meso,β complex") can be formed. This is not illustrated in FIG. 2B. The Pt-meso,β complex can be formed using substantially similar techniques to those of processes 200 and 201. However, the porphyrin ring-forming reaction can use the L-functionalized 3,5-dicarboxylate benzaldehyde 210 (FIG. 2A) instead of benzaldehyde and the L-functionalized fused benzopyrrole 230 instead of 2H-benzo[f]isoindole, resulting in the P(II) porphyrin complex having L groups on both meso and β positions.

FIG. 2C is a chemical reaction diagram illustrating a process 202 of forming a third sidechain-modified molecular sensitizer, according to some embodiments of the present disclosure. In process 202, 2,3-dicyano-1,4-hydroquinone (DCH) is combined with an organohalide (L-X, where X is a halogen atom such as bromine) and $K_2CO_3$ in dimethylformamide (DMF). The resulting reaction produces a 2,3-dicyanobenzene-1,4-di-OL ("DC-di-OL") 250. DC-OL 250 is then reacted with 1,8-diazabicyclo[5.4.0]undec-7-ene (DBU) and palladium(II) chloride ($PdCl_2$) in pentanol to produce a sidechain-modified sensitizer referred to herein as a Pd(II) phthalocyanine complex ("PdPc complex") 260.

FIG. 3A is a chemical reaction diagram illustrating a process 300 of forming a first sidechain-modified molecular annihilator, according to some embodiments of the present disclosure. A solution of perylene, (1,5-cyclooctadiene)(methoxy)iridium(I) dimer ($[Ir(OMe)(1,5-cod)]_2$), 4,4'-di-tert-butyl-2,2'-dipyridyl (dtbppy), and bis(pinacolato)diboron ($B_2pin_2$) in anhydrous cyclopentane is prepared. Oxygen can be removed from the solution (e.g., by freeze drying at least twice under vacuum). The solution can be stirred at approximately 80° C. under an inert atmosphere (e.g., $N_2$ gas) for about 72 hours. The mixture can then be passed through a silica plug with a chloroform eluent. The solvent can then be removed under reduced pressure. Purification of the resulting residue (e.g., by column chromatography) yields 2,5,8,11-tetrakis(4,4,5,5-tetramethyl-1,3,2-dioxaborolan-2-yl) perylene ("perylene-$Bpin_4$").

Perylene-$Bpin_4$ is then reacted with bis(tert-butyl)methylphosphine ($(t-Bu)_2PMe$), 5 mol % palladium(II) acetate ($Pd(OAc)_2$), and potassium tert-butoxide (t-BuOK) in tert-amyl alcohol (TAA). An organohalide (L-X, where X is a halogen atom) is also included in the reaction mixture. This reaction results in replacement of the 4,4,5,5-tetramethyl-1,3,2-dioxaborolan-2-yl substituents with —$CH_2L$ substituents to form a sidechain-modified perylene derivative 310 where each L includes a reactive functional group. Examples of L groups are discussed in greater detail with respect to FIG. 2A.

FIG. 3B is a chemical reaction diagram illustrating a process 301 of forming a second sidechain-modified molecular annihilator, according to some embodiments of the present disclosure. Process 301 involves preparation of a DMF solution containing LBr, $K_2CO_3$, and a dialkyl-5-formylisophthalate 320, where alkyl groups are represented by R. Examples of dialkyl-5-formylisophthalates 320 can include dimethyl-, diethyl-, di-propyl, di-ethylhexyl, or di-t-butyl-5-formylisophthalate. In some embodiments, LBr is replaced with another organohalide such as LCl or LI. The reaction results in a sidechain-modified annihilator 330 having L groups in place of the alkyl (R) groups on the unmodified dialkyl-5-formylisophthalate 320.

FIG. 4A is a schematic diagram illustrating a process 400 of forming surface-modified light upconversion microcapsules, according to some embodiments of the present disclosure. A core component 410 is prepared. The core component 410 can contain any appropriate materials for encapsulation in a light upconversion shell. For example, the core component 410 can contain flame retardants, fragrances, self-healing materials, etc. Examples of core components 410 are discussed in greater detail with respect to FIG. 1. In some embodiments, the core component 410 can include a solution or a suspension of [Sen] and/or [An] molecules. The core component 410 can also include a non-polar solvent such as PhCl or EPA. The concentrations of the material(s) in the core component 410 can vary.

A shell formation solution 420 is prepared as well. In some embodiments, the shell formation solution 420 is an aqueous solution of ethylene-maleic anhydride (EMA) copolymer (~2.5-5 wt % EMA), urea (~2.5 wt %), ammonium chloride (~0.25 wt %), and resorcinol (~0.25 wt %). In instances where shell polymers containing upconversion molecule repeat units are to be formed, [Sen] and/or [An] having phenol L groups can be included in the shell formation solution 420. These upconversion molecules can be formed by deprotection (e.g., by addition of an acid) of protected phenol L groups on the sidechain-modified [Sen] and/or [An] molecules in some embodiments. The phenol-substituted [Sen] and/or [An] molecules (not shown) can be added instead of or in addition to resorcinol.

In some embodiments, upconversion molecules having various L groups can be incorporated into the shell polymer as crosslinkers rather than monomers. The light upconversion molecules can also be bound to the polymer backbone. In these instances, the light upconversion molecules may be added to the solution during polymerization/curing of the shell polymer, rather than being included in the original shell formation solution 420.

The pH of the shell formation solution 420 is adjusted to about 3.5 (e.g., by addition of concentrated $HCl_{(aq)}$ and/or 10 wt % $NaOH_{(aq)}$. In some embodiments, approximately 1-2 drops of 1-octanol can be added to the solution 420 to eliminate surface bubbles. A slow stream of the core component 410 is then added to the stirring shell formation solution 420 (e.g., to a concentration of about 60 vol % core component 410) to form an emulsion 425. The emulsion 425 includes droplets of core component 410 dispersed in the shell formation solution 420. The emulsion 425 is allowed to stabilize for about 10 minutes. A polymerizing agent is then added to the emulsion 425. In process 400, the polymerizing agent is formaldehyde ($H_2CO$). For example, formalin (37 w/v % $H_2CO$ in water) can be added to the emulsion 425 to obtain an approximately 1:2 ratio of formaldehyde to urea. The emulsion 425 is then heated to about 55° C. (e.g., at a rate of about 1° C./min), and allowed to react for about four hours under continuous agitation.

During shell formation, the sizes of the light upconversion microcapsules can be controlled using a variety of well-known size control techniques. Examples of these techniques include adjusting reaction parameters such as pH, temperature, stir speed, reaction time, solvent(s), concentration of reactants, etc. In some embodiments, the microcapsules have size distributions within the micron range (e.g., about 1 μm-10 μm, 10 μm-100 μm, 250 μm-500 μm, 100 μm-1000 μm). However, microcapsules of other sizes can be formed (e.g., about 10 nm-10 mm).

The reaction results in polymerization of the urea and formaldehyde to form a suspension of microcapsules 430 having UF polymer shells encapsulating droplets of the core component 410. A cross-sectional view of a microcapsule 435 from the suspension 430 is illustrated. The microcapsule 435 has a polymer shell 440 encapsulating a droplet 450 of the core component 410. The shell 435 can be an unmodified UF polymer shell or a light upconversion UF polymer shell having molecular [Sen] and/or [An] repeat units or cross-linkers incorporated into the UF polymer. The suspension 430 is filtered to obtain the microcapsules, which can then be rinsed with water and dried (e.g., in air for about 24 h-48 h).

The microcapsule shell 440 can be surface modified in some embodiments. For example, the exterior surface of the shell 440 can be modified to include light upconversion molecules and/or other functionalities (e.g., flame retardants, matrix-binding functionalities, solubility enhancers such as PEG or hydrocarbon chains, etc.). In instances where the shell 440 includes [Sen] and/or [An] repeat units and/or crosslinkers from the shell formation solution 420, the microcapsule shell 440 can optionally remain unmodified. In some embodiments, light upconversion molecules with increased solubility in polar solvents (e.g., upconversion molecules with polar L groups and/or grafted to PEG) can be used for surface modification. The light upconversion molecules include L groups capable of binding to the surface of the microcapsule shell 440. Any appropriate L groups can be used, depending on the type of binding locations (functional groups) on the shell 440.

For example, an aqueous solution containing light upconversion molecules having trialkoxysilyl L groups (e.g., L=—$(CH_2)_n Si(OCH_3)_3$, where n is an integer greater than or equal to 1) can be prepared. The pH of this solution can be adjusted to about 7. The microcapsules prepared in process 400 (e.g., microcapsule 435) can be added to the mixture (e.g., approximately 1 wt %. microcapsules). The mixture can then be stirred for about an hour at approximately 80° C. This results in displacement of the trialkoxysilyl groups by hydroxyl groups on the UF microcapsule surface to form —Si—O—Si— covalent bonds. The resulting suspension of surface-modified upconversion microcapsules (not shown) can be filtered under vacuum. The filtered microcapsules can be dried in an oven (e.g., at about 35° C.).

Figure 4B:
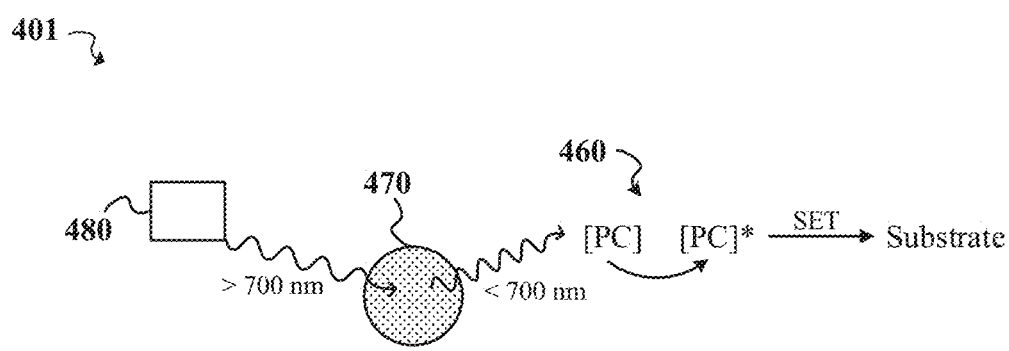
FIG. 4B is a schematic diagram illustrating a photocatalyzed reaction environment, according to some embodiments of the present disclosure.

FIG. 4B is a schematic diagram illustrating a photocatalyzed reaction environment 401, according to some embodiments of the present disclosure. The reaction involves a substrate such as polymerizable molecules (see below) that can accept a photon from a photocatalyst 460. Reaction environment 401 includes a light upconversion microcapsule 470 that can emit photons having enough energy to excite the photocatalyst 460 when the microcapsule 470 is exposed to low energy photons from a light source 480. The light upconversion microcapsule 470 can be formed in process 400 (FIG. 4A).

The light upconversion microcapsule 470 includes a light upconversion shell surrounding a core component (e.g., core 440 and shell 450, illustrated in FIG. 4A). In some embodiments, the shell includes surface- and/or matrix-bound [Sen] and [An]. However, in other embodiments the shell of the microcapsule 470 may include only [Sen] or only [An]. In these instances, [Sen] or [An] from the light upconversion shell of the microcapsule 470 can be paired with [An] or [Sen], respectively, from another source such as another microcapsule, in a solution in which the microcapsule 470 is suspended, in the core component of the microcapsule 470, etc.

The light upconversion microcapsule 470 can be suspended in a reaction mixture that contains the photocatalyst 460 and the substrate. The substrate can be any material that can accept an electron from the photocatalyst 460. For example, the substrate can be a reactant in a photocatalyzed reaction.

In some embodiments, the light upconversion microcapsule 470 is separated from the reaction mixture, but located in close enough proximity to the photocatalyst 460 to allow the photocatalyst 460 to absorb upconverted photons emitted from the microcapsule 470. While only one light upconversion microcapsule 470 is illustrated in FIG. 4B, it will be understood that reaction environment 401 can contain any appropriate number of substantially similar light upconversion microcapsules. The photocatalyzed reaction includes excitation of a photocatalyst 460 when it absorbs a photon emitted from a light upconversion microcapsule 470 as a result of triplet fusion involving light upconversion molecules in the shell matrix and/or on the shell surface of the microcapsule 470.

Examples of photocatalysts 460 that can be used can include complexes of transition metals such as ruthenium and iridium. Ruthenium photocatalysts can include [Ru(bpy)]$^{2+}$ (tris(2,2'-bipyridine)ruthenium(II)), [Ru(phen)$_3$]$^{2+}$ (tris(1,10-phenanthroline)ruthenium(II)), [Ru(bpz)$_3$]$^{2+}$ (tris(2,2'-bipyrazine)ruthenium(II)), iridium photocatalysts (e.g., dichlorotetrakis(2-(2-pyridinyl)phenyl)diiridium(III), Ir[p-F(t-Bu)-ppy]$_3$ (tris(2-(3-tert-butylphenyl)-4-tert-butylpyridine)iridium), Ir(ppy)$_3$ (tris[2-phenylpyridinato-C$^2$,N] iridium(III)), etc.), acridinium photocatalysts (e.g., 2,7-dibromo-10-methylacridone, 2,7-dibromo-mesityl-10-methylacridinium tetrafluoroborate, etc.), and organic photocatalysts such as rose bengal, 3DPA2FBN (2,4,6-tris(diphenylamino)-3,5-difluorobenzonitrile), 5,10-di(2-naphthyl)-5,10-dihydrophenazine, eosin Y, etc. However, any appropriate photocatalysts can be used. Additional examples can include tetra-n-butylammonium decatungstate, copper catalysts (e.g., Cu(dap)$_2$Cl, where dap=2,9-bis(p-anisyl)1,10-phenanthroline), metal oxides (e.g., ZnO, TiO$_2$, WO$_3$, ZrO$_2$, etc.), metal sulfides (e.g., CdS), semiconductors, etc.

The microcapsule 470 is exposed to low-energy photons (e.g., wavelengths greater than about 700 nm) from the light source 480. In some embodiments, the light source can also emit higher energy light (e.g., visible, ultraviolet, etc.). The low energy photons are absorbed and upconverted by the light upconversion molecules in the microcapsule 470. The resulting higher energy photons are absorbed by the photocatalyst 460 in its ground state ([PC]). The photocatalyst 460 can then transition to a redox-active excited state ([PC]*), followed by single electron transfer (SET) from [PC]* to the substrate.

The substrate can be a reactant in a photocatalyzed reaction. For example, blue light can be generated by a sidechain-modified sensitizer such as a Pt(II) porphyrin complex (see, e.g., FIGS. 2A and 2B) and a sidechain-modified annihilator such as a perylene derivative (see, e.g., FIG. 3A). This blue light can activate the photocatalyst 460 (e.g., [Ru(bpy)$_3$]$^{2+}$). Reactions that can then be catalyzed using SET from [PC]* can include intramolecular [2+2] cyclization of enones, vinyl azide reduction (e.g., to form pyrroles), and radical polymerization (e.g., to form polymethylmethacrylate).

In some embodiments, compounds disclosed herein can have additional moieties such as epoxides, hydroxyl, propylene carbonate, alkyl halides, esters, alkynes, amines, isocyanates, acid chlorides, chloroformates, thiols, oxiranes, silyls, carboxylic acids, alkoxyls, alkyls, etc. Herein, "alkyl" refers to $C_1$-$C_{100}$ radicals, which can be linear, branched, or cyclic. Examples of alkyl groups can include methyl, ethyl, n-propyl, iso-propyl, n-butyl, iso-butyl, sec-butyl, tert-butyl, pentyl, hexyl, octyl, cyclopropyl, cyclobutyl, cyclopentyl, cyclohexyl, and cyclooctyl. In some embodiments, the alkyls are unsaturated (e.g., alkenes and alkynes).

Additional examples of moieties that may be included in the compounds illustrated herein can include substituted analogues of cyclic alkyl groups. When cyclic, the alkyl groups can be aromatic or non-aromatic. Herein, the term "aromatic" also refers to pseudoaromatic heterocycles, which are heterocyclic substituents that have similar properties and structures (nearly planar) to aromatic heterocyclic ligands, but are not by definition aromatic. Examples of cyclic aromatic alkyls that can be used can include six-carbon aromatic rings (phenyl) and substituted variants thereof (e.g. 2-methyl-phenyl, xylyl, tolyl, etc.), $C_4$-$C_{60}$ aromatic rings, $C_4$-$C_{20}$ aromatic rings, etc. The cyclic groups can optionally include heteroatoms (e.g., nitrogen, oxygen, or sulfur) replacing at least one carbon atom in the cyclic structure.

The compounds described herein can contain one or more chiral centers. Unless otherwise noted, the disclosed structures cover all stereoisomers, conformers, rotamers, isomers, and enantiomers of the represented compounds. Further, polymers or other materials containing the disclosed compounds can include racemic forms of the compounds in addition to individual stereoisomers, as well as mixtures containing any of these. Substituents on the compounds described herein may participate in additional chemical reactions, transformations, or interactions, which can include synthesis, decomposition, single and/or double replacement, oxidation/reduction, acid/base, nucleophilic, electrophilic and radical substitutions, addition/elimination reactions, crosslinking reactions, and polymerization reactions.

Where isomers of a named alkyl, alkenyl, alkoxy, aryl, or other functional group exist (e.g., n-butyl, iso-butyl, sec-butyl, and tert-butyl), reference to a member of the group without specifying a particular isomer (e.g., butyl) is intended to include all isomers in the family (e.g., n-butyl, iso-butyl, sec-butyl, and tert-butyl). Further, unless specified otherwise, reference to one member of the group (e.g., n-butyl) includes the remaining isomers in the family (e.g., iso-butyl, sec-butyl, and ten-butyl).

Where different salts of a compound, such as a transition metal complex, exist (e.g., [Ru(bpy)$_3$]Cl$_2$ and [Ru(bpy)$_3$][PF$_6$]$_2$), reference to the compound as an ion (e.g., [Ru(bpy)$_2$]$^{2+}$ or tris(2,2'-bipyridine)ruthenium(II)) without specifying a counterion (e.g., dichloride or dihexafluorophosphate) is intended to include any available salts of the complex. Further, unless specified otherwise, reference to one counterion (e.g., Cl$^-$) refers to any other appropriate counterion (e.g., PF$_6^-$) for the compound.

Unless otherwise noted, chemical reactions are performed at ambient conditions or under slight heating with no special atmosphere or head space, and may be performed using standard organic solvents to manage mix properties such as viscosity and flow index. Standard procedures for quenching reactions, solvent removal, and purification are performed. Room temperature is between about 15° C. and 30° C. unless otherwise indicated. Ranges (e.g., time, concentration, temperature, etc.) indicated herein include both endpoints and all numbers between the endpoints. Unless specified otherwise, the use of "about," "approximately," or a tilde (~) in connection with a range applies to both ends of the range (e.g., "approximately 1 g-5 g" should be interpreted as "approximately 1 g-approximately 5 g"), and in connection with a list of ranges applies to each range in the list (e.g., "about 1 g-5 g, 5 g-10 g, etc." should be interpreted as "about 1 g-about 5 g, about 5 g-about 10 g, etc."). Unless otherwise indicated, modifying terms such as "about," "approximately," and "~" indicate +/−10% of a recited value, range of values, or endpoints of one or more ranges of values.

The processes discussed herein, and their accompanying drawings, are not to be construed as limiting. One skilled in the art would recognize that a variety of techniques may be used that vary in conditions, components, methods, etc., which ultimately generate light upconversion microcapsules. In addition, the conditions can optionally be changed over the course of a process. Further, in some embodiments processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may prepare the sidechain-modified light upconversion molecules, and a second entity may carry out the microcapsule formation.

What is claimed is:

1. A microcapsule, comprising:
    a polymer shell, comprising:
        light upconversion molecules having sidechains with reactive functional groups; and
    a core component encapsulated by the polymer shell.

2. The microcapsule of claim 1, wherein the light upconversion molecules are bound to surface functionalities on the polymer shell.

3. The microcapsule of claim 1, wherein the light upconversion molecules are incorporated into the polymer shell via copolymerization.

4. The microcapsule of claim 1, wherein the light upconversion molecules comprise a molecular sensitizer.

5. The microcapsule of claim 4, wherein the molecular sensitizer is a platinum complex of a porphyrin.

6. The microcapsule of claim 4, wherein the core component comprises a molecular annihilator.

7. The microcapsule of claim 1, wherein the light upconversion molecules comprise a molecular annihilator.

8. The microcapsule of claim 7, wherein the molecular annihilator is an organic chromophore.

9. The microcapsule of claim 1, wherein the reactive functional groups comprise silyl groups.

10. A method, comprising:
obtaining light upconversion molecules having sidechains with reactive functional groups; and
forming a microcapsule, comprising:
a polymer shell, comprising:
the light upconversion molecules; and
a core component encapsulated by the polymer shell.

11. The method of claim 10, wherein the light upconversion molecules are bound to surface functionalities on the polymer shell.

12. The method of claim 10, wherein the light upconversion molecules are incorporated into the polymer shell via copolymerization.

13. The method of claim 10, wherein the light upconversion molecules comprise a molecular sensitizer and a molecular annihilator.

14. The method of claim 10, wherein the polymer shell further comprises a urea-formaldehyde polymer.

15. An article of manufacture, comprising:
a microcapsule, comprising:
a polymer shell, comprising:
light upconversion molecules having sidechains with reactive functional groups; and
a core component encapsulated by the polymer shell.

16. The article of manufacture of claim 15, wherein the light upconversion molecules are bound to surface functionalities on the polymer shell.

17. The article of manufacture of claim 15, wherein the light upconversion molecules are incorporated into the polymer shell via copolymerization.

18. The article of manufacture of claim 15, wherein the light upconversion molecules comprise a molecular sensitizer and a molecular annihilator.

19. The article of manufacture of claim 15, wherein the light upconversion molecules comprise a molecular sensitizer, and wherein the core component comprises a molecular annihilator.

20. The method of claim 10, wherein the forming the microcapsule comprises:
polymerizing a first portion of the light upconversion molecules to form the polymer shell;
surface-modifying the polymer shell with a second portion of the light upconversion molecules, wherein the surface-modifying comprises binding the second portion of the light upconversion molecules to surface functional groups of the polymer shell.

* * * * *